Patented Nov. 29, 1927.

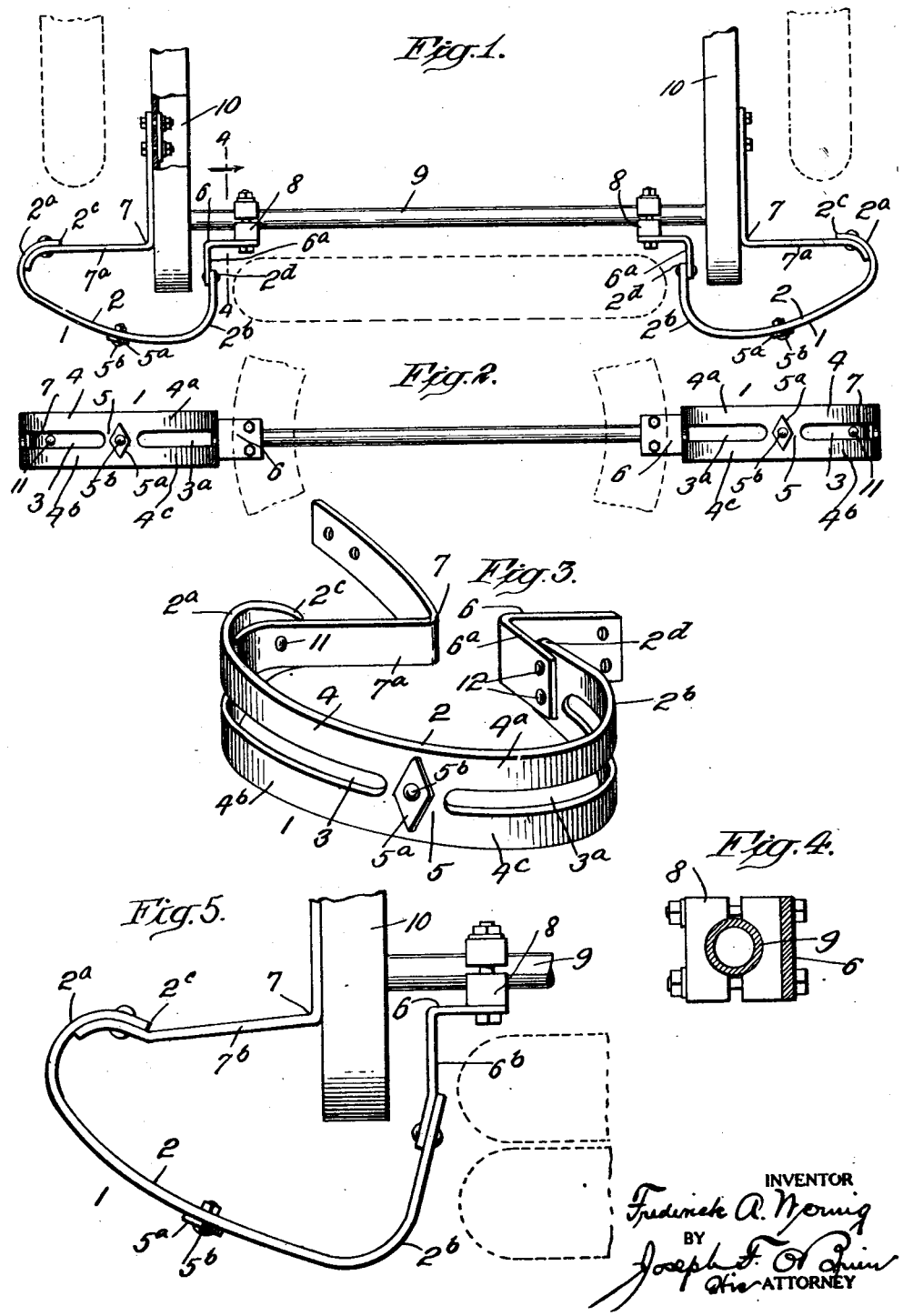

1,651,079

UNITED STATES PATENT OFFICE.

FREDERICK A. WERNIG, OF BROOKLYN, NEW YORK, ASSIGNOR TO NEW YORK WIRE & SPRING COMPANY, A CORPORATION OF NEW JERSEY.

AUTOMOBILE FENDER GUARD.

Application filed February 2, 1925. Serial No. 6,330.

This invention relates to improvements in automobile fender guards.

One of the objects of the invention is to produce a strong and rigid fender guard of the extended area type which will have great strength and durability and will be formed of a minimum number of parts, thus reducing the cost of manufacture, avoiding loosely jointed parts, and eliminating rattling or noise therefrom.

Another object of my invention is to produce a fender guard of the extended impact area type embodying an impact member provided with continuous double-bar loop portions formed in one piece so as to provide ends without projecting parts and increase the strength and solidity of the guard.

Another object of my invention is to produce a fender guard embodying an impact member of extended area and slotted to provide a double-bar body portion and continuous double-bar end-loops formed of a single piece of metal, which guard will be extremely neat and ornamental in appearance; will have an ornamental effect similar to the double or parallel bar guard; may be formed by stamping out from a single piece of metal a central portion or portions to provide at the impact portion an elongated slot or slots separating upper and lower twin bars from each other while maintaining great strength together with lightness and enabling attractive appearance to be procured.

Another object of my invention is to enable the production of a one-piece fender guard which may be adjustably mounted on different types of automobiles simply by the use of fastening brackets of varying sizes and forms.

Another object of my invention is to produce a fender guard which will be complete in one piece except for the supporting brackets.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a plan view of the rear end of an automobile chassis showing in plan a pair of my improved fender guards mounted thereon;

Fig. 2 is an end elevation of the guards shown in Fig. 1;

Fig. 3 is a perspective view of a guard embodying my invention shown in connection with the mounting brackets;

Fig. 4 is a section on the line 4—4 of Fig. 1; and

Fig. 5 is an enlarged plan view of a guard showing the method of adjusting my standard impact bar for the purpose of fitting varying types of automobiles.

Referring now to these drawings, which illustrate a preferred embodiment of my invention, 1 indicates a fender guard of an extended impact area type, which will harmonize with the usual double or spaced parallel-bar front bumpers of a car and comprises an impact member 2 formed of a single plate of material and preferably of a thickness substantially equal to the usual spring-bar material and of a vertical width substantially equal to the conventional double parallel bar front bumper. This plate 2, of such extended vertical area, is provided between its upper and lower edges with slots 3 and $3^a$ separating the single piece of material into parallel upper and lower bar sections or portions 4, $4^a$ and $4^b$, $4^c$ respectively and providing an integral strut portion 5 between the slots, which strut portion 5 preferably has applied thereto an ornamental plate $5^a$ secured by a rivet $5^b$. Said impact member is preferably slightly bowed from end to end and merges at one end with an integral and reversely-turned open attaching loop $2^a$ and at the other end in another integral attaching portion $2^b$ curved inwardly from the body portion at an angle of approximately ninety degrees. These attaching portions preferably are arranged to cause the ends $2^c$ and $2^d$ beyond said loop and curved portion to project toward each other and toward the chassis of the car at substantially right angles so as to enable one to abut against and be attached to a transversely-disposed bracket arm and the other to abut against and be attached to a longitudinally-disposed bracket arm. As shown, both of said integral ends $2^c$ and $2^d$ are reduced in area and fastened, as illustrated, by rivets 11 and 12 to arms $6^a$ and $7^a$ respectively of supporting brackets 6 and 7 which may be attached to the chassis of the car in any conventional manner, the bracket 6 being directly connected by a clamp 8 to the rear bar 9 and the bracket 7 being directly connected to the rail 10.

It will be seen that with the applicant's invention, a pair of guards may either be mounted in a position relatively close to the chassis so as to allow space for a single spare tire only, as illustrated in Fig. 1, or said pair may be mounted in a more remote position, as illustrated in Fig. 5, and furthermore, that no change will be necessary except in the length and inclination of the attaching arms 6ᵇ, 7ᵇ, of the supporting brackets 6 and 7.

Having described my invention, I claim:—

1. An automobile fender guard embodying supporting bracket bars adapted to be attached to the chassis of the automobile, a guard body of a vertical width increased in area in relation to said bracket bars and comprising a single plate of bar metal of a thickness substantially equal to the conventional spring-metal bumper bar, said plate being provided at opposite ends with integral and inwardly-disposed curved sections terminating in ends overlapping and rigidly connected to ends of said bracket bars, said guard body also having between its upper and lower edges a slot for separating the major portion of the guard into spaced double-bar sections and producing the appearance of twin parallel spaced bars.

2. An automobile fender guard embodying supporting bracket bars adapted to be attached to the chassis of the automobile, a guard body of a vertical width increased in area in relation to said bracket bars and comprising a single plate of bar metal of a thickness substantially equal to the conventional spring-metal bumper bar, said plate being provided at one end with an integral reversely-turned loop terminating in a transversely-disposed attaching end and having at the other end an inwardly-curved portion terminating in a longitudinally-disposed attaching end, both of said ends overlapping and having a rigid and permanent connection with the ends of said bracket bars, said guard body also having between its upper and lower edges a pair of slots arranged in the same plane and spaced by an integral strut portion, said slots separating the major portion of the guard body into spaced double-bar sections and producing the appearance of twin parallel spaced-bars.

3. An automobile fender guard embodying supporting bracket bars adapted to be attached to the chassis of the automobile, a guard body of a vertical width increased in area in relation to said bracket bars and comprising a single plate of bar metal of a thickness substantially equal to the conventional spring metal bumper bar, said plate having at one end an integral reversely-turned loop terminating in a transversely-disposed attaching end, and having at the other end an inwardly-curved portion terminating in a longitudinally-disposed attaching end, both of said ends overlapping and having a rigid and permanent connection with the ends of said supporting bracket members, said guard body also having two longitudinally-extending slots between its upper and lower edges extending in opposite directions from a point near the middle of the guard to points contiguous to the opposite ends thereof to provide separated bar sections and a single integral strut portion between said two slots at said middle portion of the guard body, and said strut portion being provided with an ornamental plate, the parts being arranged to produce the appearance of symmetrically-disposed twin parallel-spaced bars.

In witness whereof, I have signed my name to the foregoing specification.

FREDERICK A. WERNIG.